(12) United States Patent
Huang

(10) Patent No.: US 6,186,052 B1
(45) Date of Patent: Feb. 13, 2001

(54) INFUSION MAKER

(76) Inventor: Frank Teh-Hsiung Huang, Suite 804, No. 128, Sec. 3, Ming-Sheng E. Rd., Taipei (TW)

( * ) Notice: Under 35 U.S.C. 154(b), the term of this patent shall be extended for 0 days.

(21) Appl. No.: 09/482,860

(22) Filed: Jan. 14, 2000

(51) Int. Cl.$^7$ ........................................... A47J 31/38
(52) U.S. Cl. ................................. 99/297; 99/287
(58) Field of Search ................ 99/297, 287, 285, 99/286, 279; 426/433

(56) References Cited

U.S. PATENT DOCUMENTS 5,570,623 * 11/1996 Lin ............................... 99/297 X
5,635,233 * 6/1997 Levinson ........................ 99/297 X
6,079,316 * 6/2000 Barden et al. ...................... 99/297

\* cited by examiner

Primary Examiner—Reginald L. Alexander
(74) Attorney, Agent, or Firm—Bacon & Thomas, PLLC

(57) ABSTRACT

An infusion maker comprises a lid set, a central rod and a filter assembly disposed at one end of the rod, a body, and a base with a handle, wherein a retaining portion is formed in the body; a corresponding snap-fastening portion is arranged in the base; and an elastic element is disposed in the boundary between the body and the base for properly packing the snap-fastening portion and the retaining portion to combine the body onto the base so that a user can couple the body with the base to form the infusion maker or detach them from each other for cleaning easily.

4 Claims, 3 Drawing Sheets

INFUSION MAKER

BACKGROUND OF THE INVENTION

This invention relates to an infusion maker, particularly to an infusion maker comprising a body and a base that can be snap-combined for operation or separated for cleaning.

A conventional infusion maker is usually composed of a lid set, a body, and a base (frame), wherein the lid set further contains a centered rod having a knob at one end and a filter assembly movable up and down at the other; and a handle is disposed on the base for easy holding.

If the combination of the body and the base is overtight, a user is to risk fracture of the body when he is trying to separate the body from the base for washing and cleaning; or, on the contrary, if the combination is loose, he has to put his hand on the hot lid to refrain the body from swaying for moving the filter assembly smoothly when he is brewing with the infusion maker.

In view of the abovesaid imperfection, the inventor of this invention has consequently developed and proposed an improved mechanism pertaining to the subject matter.

SUMMARY OF THE INVENTION

The primary object of this invention is to provide an improved infusion maker with a preferred combination mechanism for easy mounting and dismounting its body on or from its base to thereby eliminate mentioned defect of improper tightness in the conventional. For realizing this object, this invention is to circularly dispose a snap-fastening portion at one end of the body of the infusion maker and a corresponding snap-retaining portion at the base, and further, an elastic element at the boundary between the body and the base to ensure a perfect joint thereof.

BRIEF DESCRIPTION OF THE DRAWINGS

For a better understanding to the present invention, together with further advantages or features thereof, at least one preferred embodiment will be elucidated below with reference to the annexed drawings in which.

DETAILED DESCRIPTION OF THE PREFERRED EMBODIMENT

Figure 1:
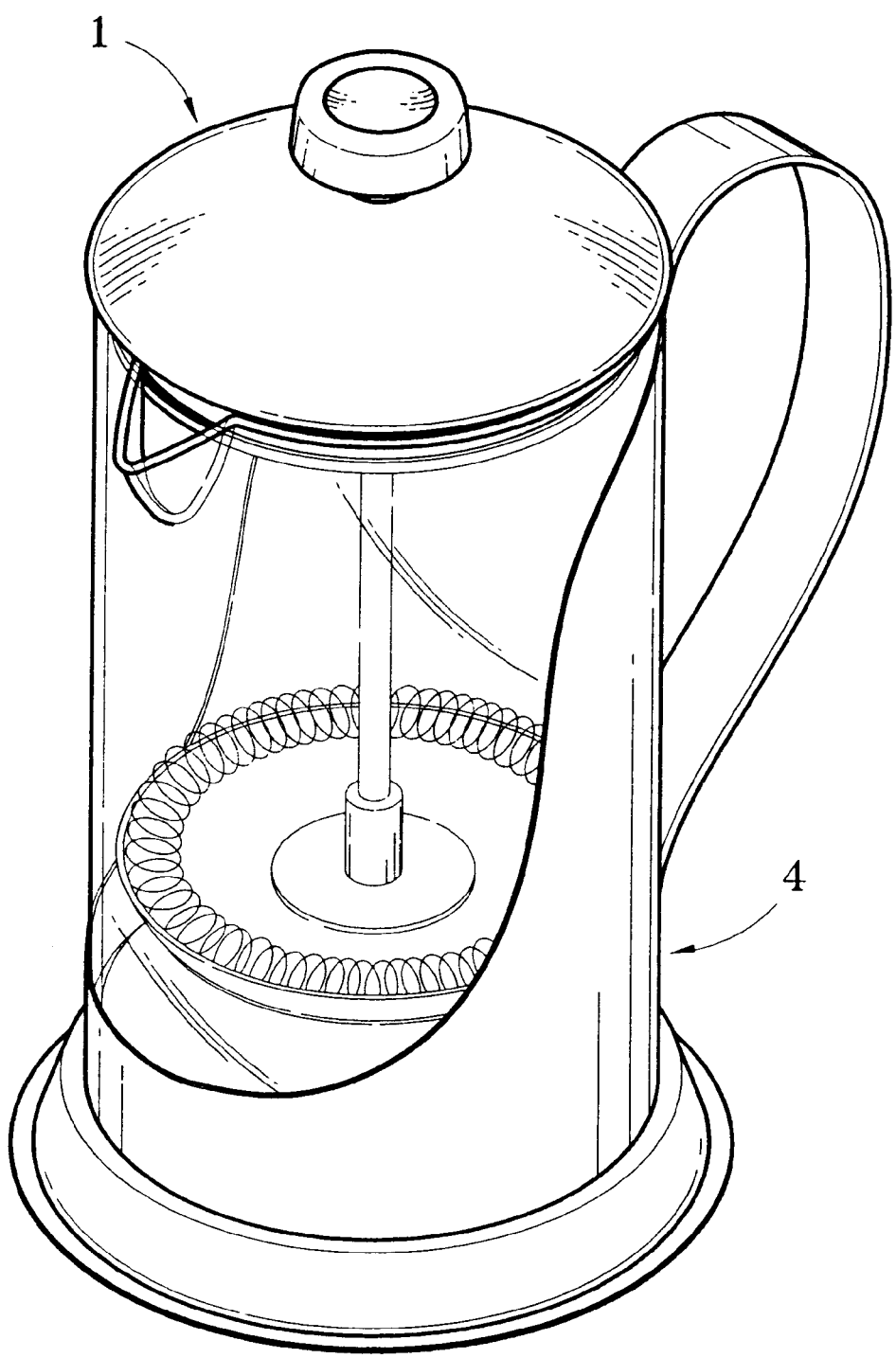
FIG. 1 is a three-dimensional assembled view of this invention.
Figure 2:
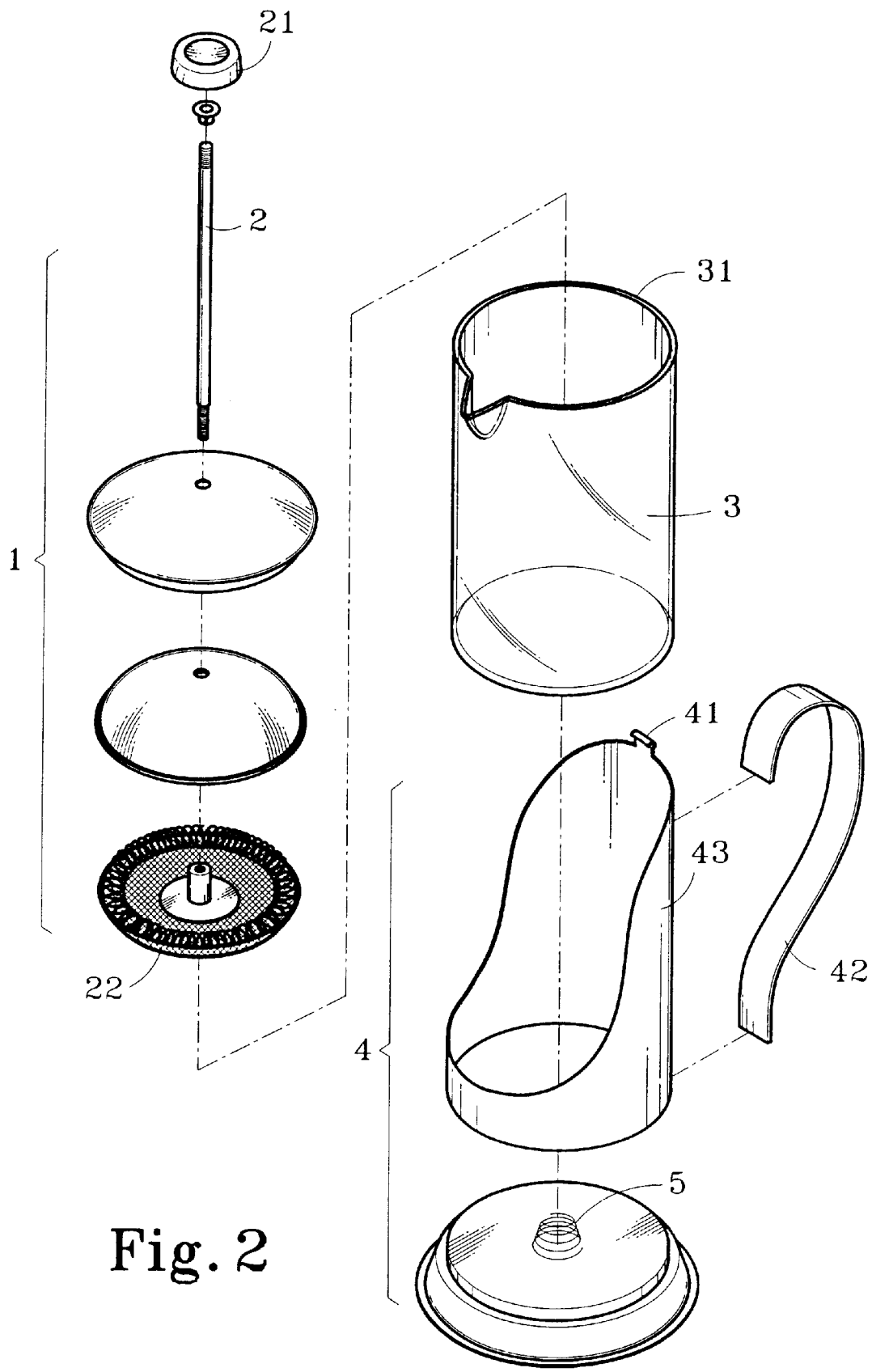
FIG. 2 is a three-dimensional exploded view of this invention.

As shown in FIG. 1 and FIG. 2, this invention comprises a lid set 1 with a rod 2 penetratingly disposed in its center, a knob 21 fixedly jointed with one end of the rod 2 and a filter assembly 22 coupled to the other, a body 3 collared the lid set 1 to allow the filter assembly 22 to move up and down, and a base 4 with a handle 42 to be jointed with the body 3. The structure of this invention is substantially the same with a conventional infusion maker, however, the combination manner of the body 3 and the base 4 is rather stiff in the latter—either too tight to separate or too loose to hold.

Figure 3:
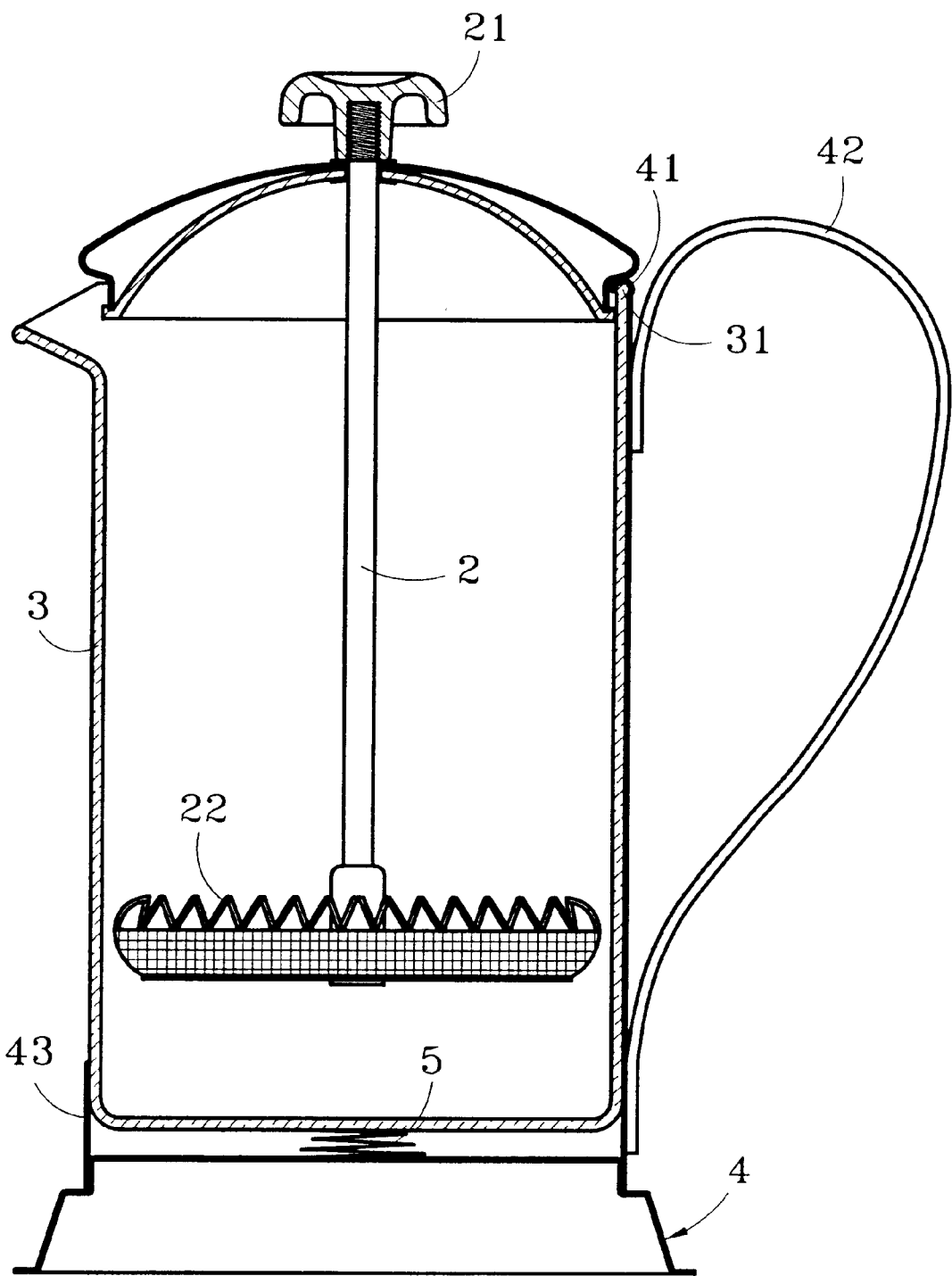
FIG. 3 is a cutaway sectional view of this invention.

Now referring to FIG. 3, a retaining portion 31 is formed in circumference of an open end of the body 3 and a snap-fastening portion 41 for buckling the retaining portion 31 is made in the base 4. Moreover, an elastic element 5 is located in the boundary between the body 3 and the base 4 for packing the combination of the retaining portion 31 and the snap-fastening portion 41 for fixedly engaging the body 3 with the base 4. In the foregoing embodiment, a receptacle 43 is arranged on the base 4 with the elastic element 5 disposed therein, the snap-fastening portion 41 is formed at a top end of the receptacle 43, and the retaining portion 31 is disposed at the open end of the body 3.

Furthermore, the foregoing elastic element 5 of this invention may be made in form of a spring, such as a spiral or a piece spring or whatever any elastic material or mechanism that can elastically pack the retaining portion 31 of the body 3 and the snap-fastening portion 41 of the base 4 tightly. As a matter of fact, the location of the elastic element 5 is not confined at the bottom end of the body 3, to people who are familiar with the relevant techniques, it is feasible to dispose the elastic element 5 at the body 3 laterally to fit diversified designs of the base 4. Similarly, the position of the retaining portion 31 and the snap-fastening portion 41 may also be shifted depending on different design considerations. For example, a support rack or the like may be arranged at the body 3 to form a framework as good as the retaining portion 31 with a corresponding arrangement of the snap-fastening portion 41.

As the retaining portion 31 and the snap-fastening portion 41 of this invention are elastically packed with the elastic element 5, hence, a user can hold the handle 42 with one hand and pull the rod 2 with the other simultaneously to get rid of risking a scald when he is using an infusion maker. On the contrary, when cleaning the infusion maker is desired, he can hold the handle 42 with one hand and press the body 3 downwards to detach the retaining portion 31 from the snap-fastening portion 41 with the other, then tilt to take the body 3 out of the receptacle 43 easily. For remounting the body 3 onto the base 4, a reverse procedure will do.

In the above described, a preferred embodiment has been elucidated with reference to drawings annexed, it is apparent that numerous variations or modifications may be made without departing from the true spirit and scope thereof, as set forth in the following claims.

What is claimed is:

1. An infusion maker, comprising:
   a lid set having a rod penetratingly disposed in its center, wherein a knob is disposed at one end of said rod and a filter assembly is jointed with the other;
   a body, wherein said lid set is shallowly inserted to allow said filter assembly to move up and down; and
   a base with a handle being jointed to said body, wherein a retaining portion is arranged in said body and a corresponding snap-fastening portion is formed in said base; and an elastic element is disposed in boundary between said retaining portion and said snap-fastening portion for packing closely said body onto said base.

2. The infusion maker of claim 1, wherein a receptacle is arranged in said base; and said elastic element is disposed in said receptacle.

3. The infusion maker of claim 2, wherein said snap-fastening portion is disposed at a top end of said receptacle; and said retaining portion is formed in a circumference of an open end of said body.

4. The infusion maker of claim 1, wherein said elastic element is a spring.

* * * * *